(12) United States Patent
Zhu et al.

(10) Patent No.: US 8,746,573 B2
(45) Date of Patent: Jun. 10, 2014

(54) SMART CARD HOLDING MEMBER AND PORTABLE ELECTRONIC DEVICE EMPLOYING THE SAME

(75) Inventors: Guang-Ya Zhu, Shenzhen (CN); Yue-Hui Lv, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 1058 days.

(21) Appl. No.: 12/781,952

(22) Filed: May 18, 2010

(65) Prior Publication Data
US 2011/0174883 A1 Jul. 21, 2011

(30) Foreign Application Priority Data
Jan. 20, 2010 (CN) .......................... 2010 1 0300489

(51) Int. Cl.
*G06K 7/00* (2006.01)
(52) U.S. Cl.
USPC .......................................................... 235/486
(58) Field of Classification Search
USPC .......................................................... 235/486
See application file for complete search history.

(56) References Cited

U.S. PATENT DOCUMENTS

| | | | |
|---|---|---|---|
| 6,175,505 B1* | 1/2001 | Cheng et al. | 361/752 |
| 7,306,491 B1* | 12/2007 | Wei et al. | 439/630 |
| 2005/0255753 A1* | 11/2005 | Buschmann | 439/630 |
| 2010/0302742 A1* | 12/2010 | Lin | 361/724 |

\* cited by examiner

*Primary Examiner* — Seung Lee
*Assistant Examiner* — Tae Kim
(74) *Attorney, Agent, or Firm* — Novak Druce Connolly Bove + Quigg LLP

(57) ABSTRACT

A smart card holding member in this exemplary embodiment includes a main member, a connection member, and two resisting members. The connection member is connected to one end of the main member and bends toward the main member. The resisting members bend from opposite sides of the main member and each resisting member includes a locking section for fastening a battery in position. The resisting members are respectively connected to opposite sides of the main member to form an accommodating space for receiving a smart card therein. One part of the smart card is exposed out from the main member to be removed. A portable electronic device employing the smart card holding member is also described.

10 Claims, 6 Drawing Sheets

US 8,746,573 B2

SMART CARD HOLDING MEMBER AND PORTABLE ELECTRONIC DEVICE EMPLOYING THE SAME

BACKGROUND

1. Technical field

The disclosure generally relates to smart card holding members and portable electronic devices having smart card holding members and, more particularly relates to a smart card holding member for retaining a smart card in the portable electronic device.

2. Description of the Related Art

Portable electronic devices, such as mobile phones, or personal digital assistants (PDAs), usually define a receiving groove for retaining smart cards, such as a subscriber identity module (SIM) card. The smart card is accommodated in the receiving groove to electrically connect to a circuit of the portable electronic device.

The portable electronic devices use holders to retain and protect the smart cards and to keep smart cards from moving out of the receiving groove. However, a typical smart card holder generally has a more complicated structure, and needs a larger area to secure and remove the smart card, which often is inconvenient for operation and also not conducive towards miniaturization of portable electronic devices.

Therefore, there is room for improvement within the art.

BRIEF DESCRIPTION OF THE DRAWINGS

Many aspects of a smart card holding member and portable electronic device employing the same can be better understood with reference to the following drawings. The components in the drawings are not necessarily drawn to scale, the emphasis instead being placed upon clearly illustrating the principles of the exemplary smart card holding member and portable electronic device employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
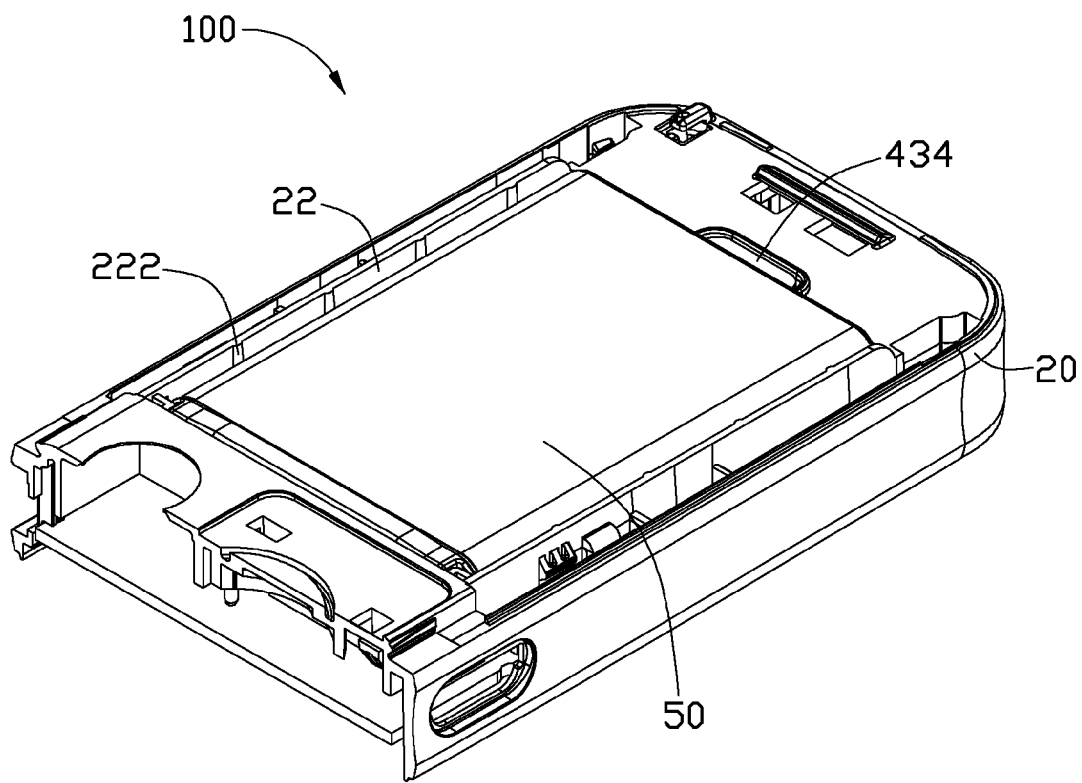
FIG. 1 is a schematic assembled view of a portable electronic device including a main body, a smart card, a smart card holding member, and a battery, according to an exemplary embodiment.
Figure 2:
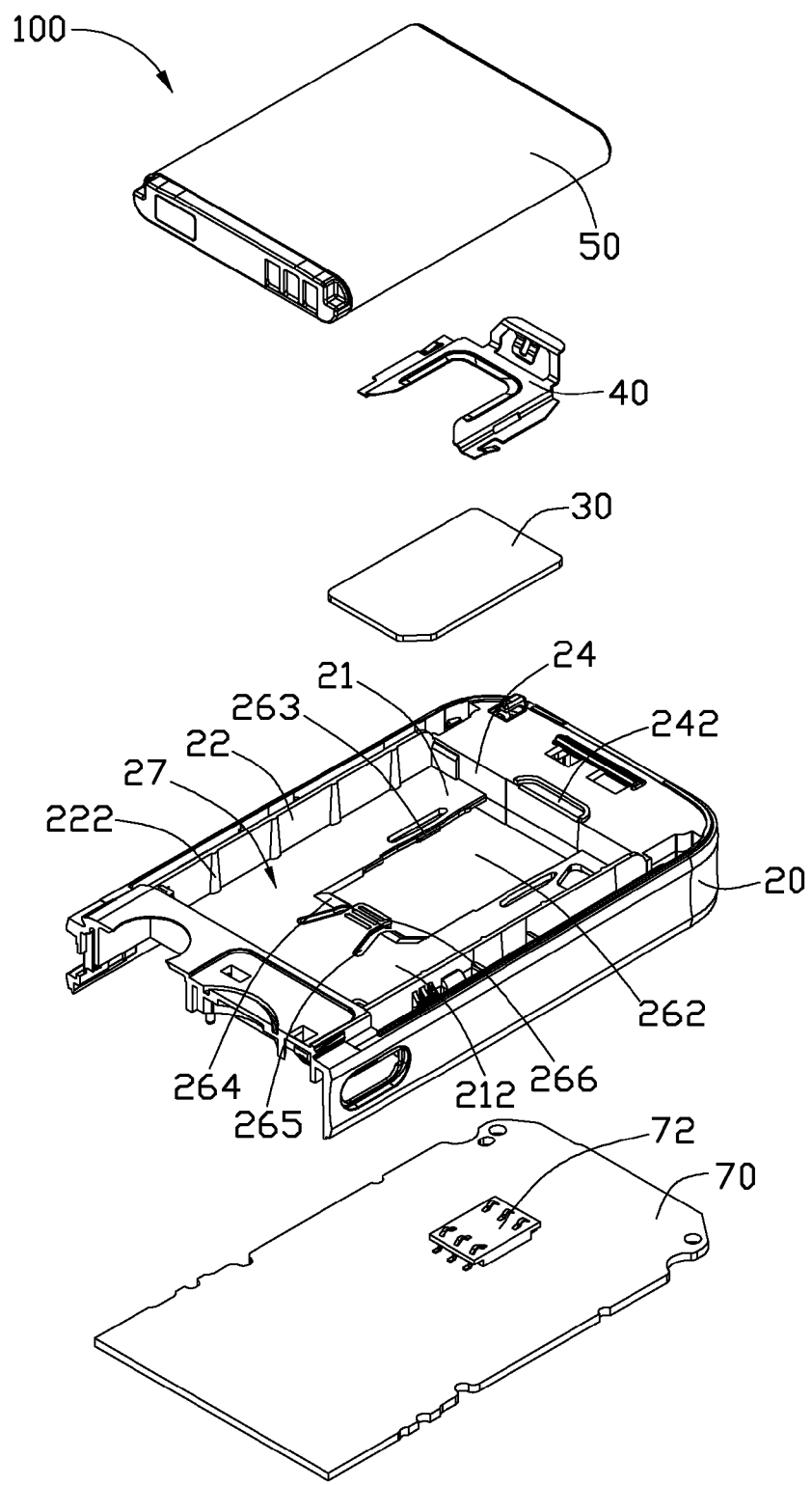
FIG. 2 is an exploded view of the portable electronic device shown in FIG. 1.
Figure 3:
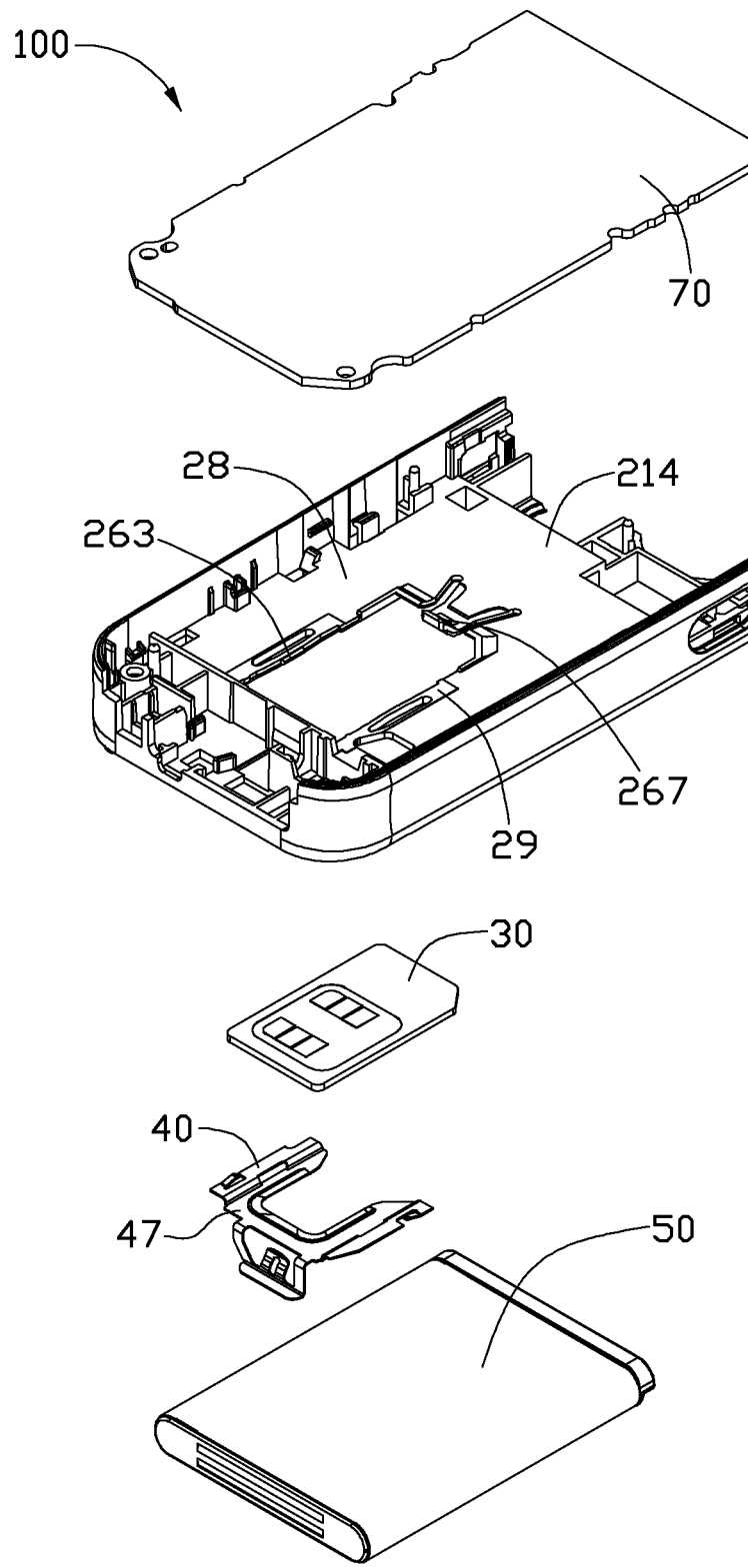
FIG. 3 is similar to FIG. 2, but shown from another angle.

FIGS. 1, 2 and 3 show an exemplary embodiment of a portable electronic device 100 (partially shown), which may be a PDA, a mobile phone. The mobile phone is used here as an example, for the purpose of describing the details of the portable electronic device 100. The portable electronic device 100 includes a main body 20, a smart card 30, a smart card holding member 40, a battery 50, and a circuit board 70. The smart card holding member 40, the battery 50 and the circuit board 70 are detachably installed in the main body 20. The smart card 30 is detachably installed in the smart card holding member 40.

The main body 20 may be a partial housing of the portable electronic device 100 in this embodiment and includes a bottom plate 21, sidewalls 22, and end walls 24. The bottom plate 21 includes a first surface 212 and a second surface 214. The sidewalls 22 and the end walls 24 are located around the bottom plate 21.

The sidewalls 22 and the end walls 24 are perpendicular to the first surface 212 and form a receiving space 27 by surrounding the first surface 212. The sidewalls 22 perpendicularly extend from opposite sides of the second surface 214 to form a securing section 28 thereof. The main body 20 defines a groove 242 adjacent to sidewall 24 and communicating with the receiving space 27. Each sidewall 22 includes a plurality of protrusions 222 extending toward the receiving space 27. The outer surface of each protrusion 222 is shaped to be capable of retaining the battery 50 therein.

The bottom plate 21 defines a receiving hole 262 adjacent to the groove 242. The receiving hole 262 is generally rectangular and its width is larger than the width of the smart card 30 to removably receive the smart card 30 therein. The bottom plate 21 includes two holding sections 263 extending toward the receiving hole 262. The holding sections 263 are respectively located at the opposite sides of the receiving hole 262 and are capable of securing the smart card holding member 40 in the main body 20.

The bottom plate 21 includes a slope 264 located opposite to the groove 242 and adjacent to the receiving hole 262. The slope 264 extends from the surface of the bottom plate 21 toward the receiving hole 262, making it easy to install and remove the smart card 30. The bottom plate 21 defines two slits 265 therein. The two slits 265 pass through the slope 264 to communicate with the receiving hole 262, resulting in the slope 264 being configured to form an operating section 266 and a holding section 267 extending from the distal end of the operating section 266 thereon.

The operating section 266 can deformably move in the direction perpendicular to the first surface 212. The distal end of the operating section 266 faces toward the receiving hole 262 thereof. The holding section 267 protrudes toward the receiving hole 262 and its thickness is less than the thickness of operating section 266. Thus the holding section 267 is capable of retaining one end of the smart card 30. In this embodiment, the operating section 266 can be formed by directly extending from the side of the receiving hole 262, and the slits 265 can be omitted. Thereby, the operating section 266 protrudes from the side of the receiving hole 262 and can still move in the direction perpendicular to the first surface 212.

The receiving space 27 is capable of accommodating the battery 50 and communicates with the groove 242. The securing section 28 is capable of receiving the circuit board 70. The second surface 214 defines two sliding slot 29 located at opposite sides of the receiving hole 262 therein.

Figure 4:
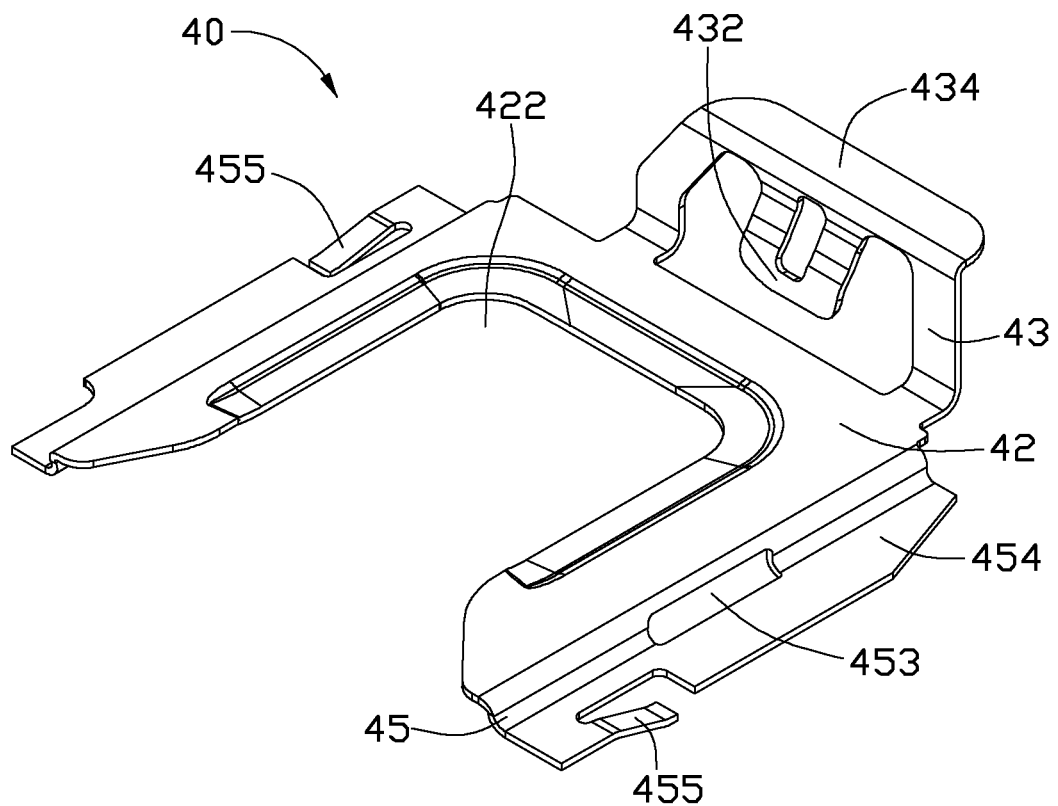
FIG. 4 is an enlarged view of the smart card holding member shown in FIG. 2.
Figure 5:
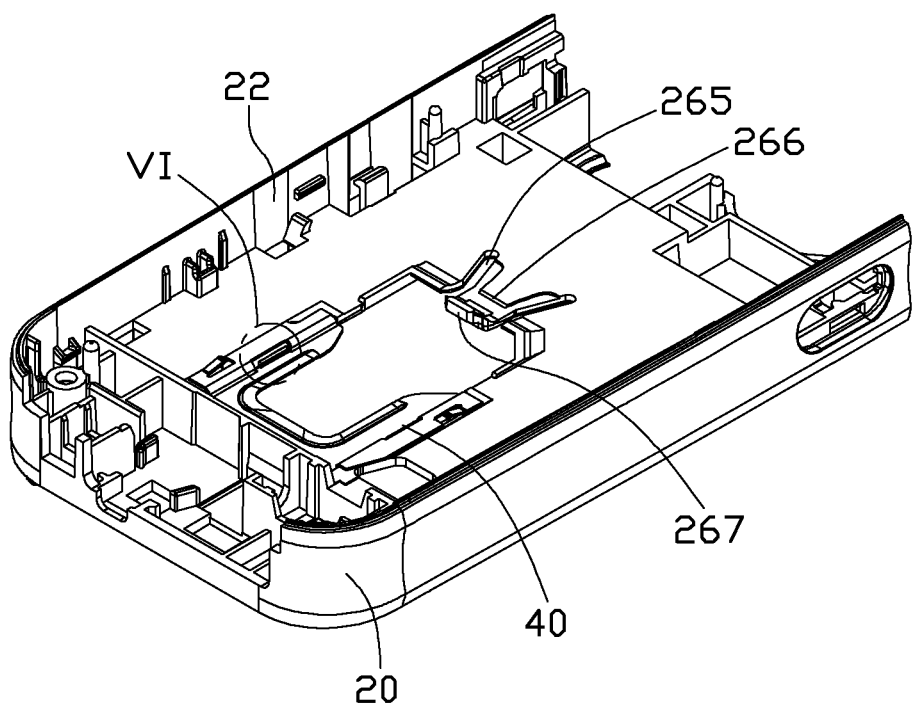
FIG. 5 is similar to FIG. 1, but shown from another angle.

Further referring to FIGS. 4 and 5, the smart card holding member 40 may be made from stainless steel, copper alloy or other metal and can be formed by punching and/or cutting a piece of metal material to form a holder to retain the smart card 30. The smart card holding member 40 includes a main member 42, a connection member 43 perpendicularly connected to the main member 42, and two resisting members 45. The two resisting members 45 are perpendicularly connected to opposite sides of the main member 42, respectively, resulting in forming an accommodating space 47 (shown in FIG. 3) to receive the smart card 30.

The connection member 43 and the resisting members 45 are respectively located at opposite surfaces of the main member 42. The length of the main member 42 is less than the length of the smart card 30, thus part of the smart card 30 is exposed from the smart card holding member 40 when assembled. The main member 42 defines a substantially U shaped opening 422 located throughout center of the main member 42.

The connection member 43 deforms to the main member 42 and includes a locking section 432 and an engaging section 434 extending from one end of the locking section 432. The locking section 432 is connected to the engaging section 434 and its distal end deforms toward the main member 42. The locking section 432 is capable of resisting against one end of the battery 50 by elastic deformation. The engaging section 434 is placed within the groove 242.

Each resisting member 45 defines a positioning hole 453 connected to the accommodating space 47 thereof. The positioning holes 453 are capable of receiving the corresponding holding sections 263 to retain the smart card holding member 40 on the main body 20.

The distal end of each resisting member 45 bends and extends in the direction away from the main member 42 to form a sliding section 454, so that the resisting member 45 is substantially "L" shaped. The positioning holes 453 are respectively located at the bending parts of the resisting members 45. The sliding section 454 is co-planar to the main member 42 and can be slidably accommodated in the corresponding sliding slots 29. Each sliding section 454 can be punched and/or cut to form an elastic arm 455 bending away the second surface 214. The elastic arms 455 are capable of resisting against the housing or other components of the portable electronic device 100 to increase the combined force of the smart card holding member 40.

The circuit board 70 may be an existing printed circuit board (PCB) and includes a connector 72. The connector 72 is aligned with receiving hole 262 to electrically connect the smart card 30.

Figure 6:
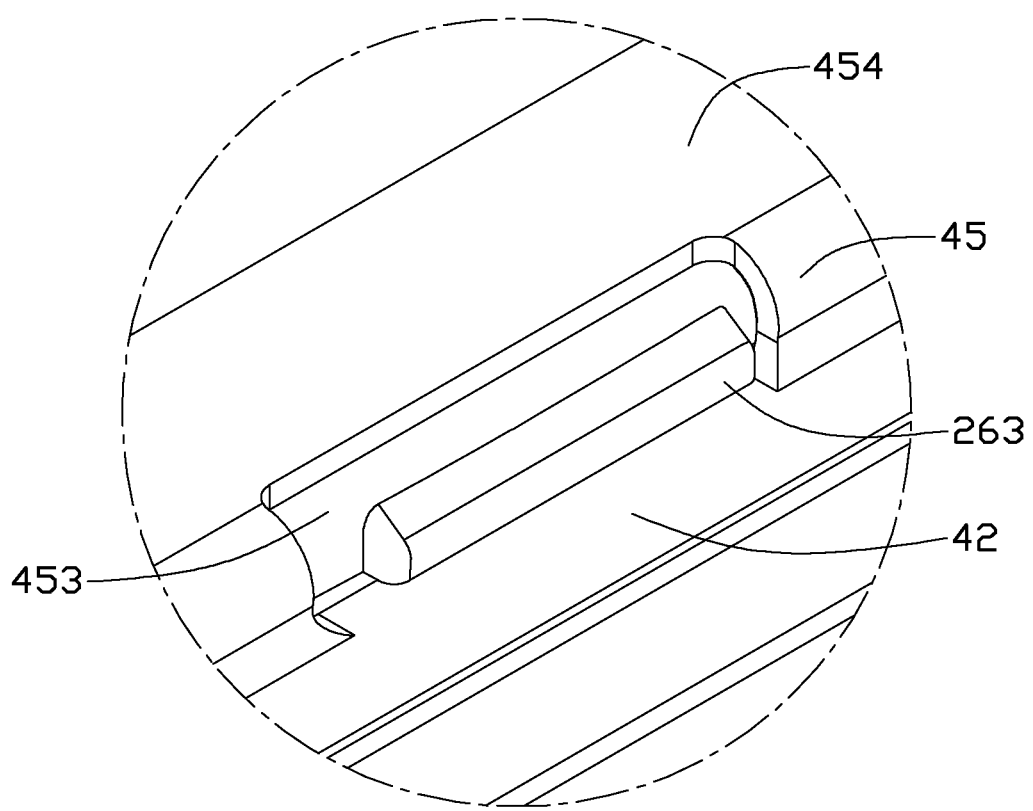
FIG. 6 is an enlarged view of portion VI shown in FIG. 5.

Also referring to FIGS. 1 and 6, when assembling the smart card holding member 40 to the main body 20, the smart card holding member 40 is received in the receiving space 27 and is aligned with the receiving hole 262. The connection member 43 is leveled with the groove 242. The resisting members 45 are passed through the receiving hole 262 by elastic deformation and the main member 42 is accommodated in the receiving hole 262. Thereby, the engaging section 434 is received inside the groove 242, the holding sections 263 are respectively installed in the corresponding positioning holes 453, and the sliding sections 454 are slidably located in the corresponding sliding slots 29. The smart card 30 then is inserted into the accommodating space 47 along the slope 264, until the smart card 30 is fully accommodated in the accommodating space 47 therein. One end of the smart card 30 resists the end wall 24, and another end resists the distal end of the operating section and is placed on the holding section 267. The smart card 30 is electrically connected to the circuit board 70 through the connector 72. Thus, the smart card holding member 40 is assembled to the main body 20.

When removing the smart card 30 from the smart card holding member 40, the battery 50 is removed from the receiving space 27. The operating section 266 is pushed in the direction away from the first surface 212 and is deformed, so that the operating section 266 fails to resist an end of the smart card 30. Since the length of the smart card 30 is larger than the main member 22, a part of smart card 30 is exposed out from the opening 422 of the main member 42. Thereby, the smart card 30 is moved out from the smart card holding member 40 along the slope 264.

In summary, in the smart card holding member 40 and portable electronic device employing the same of the exemplary embodiment, the smart card holding member 40 has a simple structure and is conductive to operate and reduce the size of the portable electronic device 100. Thus, the smart card 30 can be removed quickly from the smart card holding member 40. Moreover, the locking section 432 of the connection member 43 is capable of resisting one end of the battery 50 to fasten the battery 50 without additional locking mechanism, reducing the design costs.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A portable electronic device, comprising:
a main body including a bottom plate;
a circuit board installed in the main body;
a smart card connected to the circuit board; and
a smart card holding member installed in the main body, wherein the smart card can be removably installed in the smart card holding member, the main body defines a receiving hole capable of accommodating the smart card holding member, the smart card holding member comprises a main member and two resisting members bending from opposite sides of the main member, the resisting members are respectively connected to the main member to form an accommodating space, and the smart card is partially received in the accommodating space and partially exposed out from the main member;
wherein the receiving hole is defined in the bottom plate, the bottom plate comprises a slope adjacent to the receiving hole, and the slope extends from the bottom plate toward the receiving hole and is capable of assembling and removing the smart card;
wherein the bottom plate comprises a first surface and a second surface opposite to the first surface, the main body further comprises sidewalls perpendicular to the second surface to form a securing section thereof, and the securing section is capable of receiving the circuit board therein, the main body further comprises end walls, the end walls and the sidewalls are connected to the first surface and form a receiving space, and the receiving space is capable of accommodating the battery therein, the receiving hole is connected to the receiving space and the securing section, the bottom plate defines two slits connected to the receiving hole, the slits pass through the slope to communicate with the receiving hole, resulting in the slope being configured to form an operating section and a holding section extending from the distal end of the operating section.

2. The portable electronic device as claimed in claim 1, wherein the smart card holding member comprises a connection member bending from one end of the main member, the connection member comprises a locking section capable of fastening a battery in position through elastic deformation.

3. The portable electronic device as claimed in claim 2, wherein the main member defines an opening, the smart card is partially exposed out from the opening to remove the smart card from the smart card holding member.

4. The portable electronic device as claimed in claim 1, wherein each resisting member defines a positioning hole connected to the accommodating space, the main body comprises two holding sections respectively located at opposite sides of the receiving hole, and the holding sections is received in the corresponding positioning holes to secure the smart card holding member on the main body thereon.

5. The portable electronic device as claimed in claim 1, wherein each sidewall includes a plurality of protrusions extending toward the receiving space, and the protrusions are capable of retaining the battery in position.

6. The portable electronic device as claimed in claim 1, wherein the operating section faces toward the receiving hole to hold the smart card, the operating section is capable of deformably moving in the direction perpendicular to the first surface to remove the smart card, and the holding section protrudes toward the receiving hole to secure the smart card.

7. The portable electronic device as claimed in claim 1, wherein the smart card holding member is formed by punching and/or cutting a piece of metal material.

8. A portable electronic device, comprising:
  a main body including a bottom plate, the bottom plate defining a receiving hole and a slope adjacent to the receiving hole and extending toward the receiving hole; and
  a smart card holding member installed in the receiving hole of the main body for removably receiving a smart card, wherein the smart card holding member comprises a main member and two resisting members bending from opposite sides of the main member, the resisting members are respectively connected to opposite sides of the main member to form an accommodating space, and the smart card is held in the accommodating space and partially exposed out from the main member, the slope is capable of assembling and removing the smart card;
  wherein the bottom plate defines two slits connected to the receiving hole, the slits pass through the slope to communicate with the receiving hole, resulting in the slope being configured to form an operating section and a holding section extending from the distal end of the operating section.

9. The portable electronic device as claimed in claim 8, wherein the smart card holding member comprises a connection member bending from one end of the main member, the connection member comprises a locking section capable of fastening a battery in position through elastic deformation, and the main member defines an opening, the smart card is partially exposed out from the opening to remove the smart card from the smart card holding member.

10. The portable electronic device as claimed in claim 8, wherein the operating section faces toward the receiving hole to hold the smart card, and the holding section protrudes toward the receiving hole to secure the smart card.

* * * * *